(12) United States Patent
Lipan

(10) Patent No.: US 9,727,072 B2
(45) Date of Patent: Aug. 8, 2017

(54) PHOTOVOLTAIC SYSTEM MAXIMUM POWER POINT TRACKING

(75) Inventor: Tudor Lipan, Ottawa (CA)

(73) Assignee: SOLANTRO SEMICONDUCTOR CORP. (CA)

( * ) Notice: Subject to any disclaimer, the term of this patent is extended or adjusted under 35 U.S.C. 154(b) by 770 days.

(21) Appl. No.: 14/003,578

(22) PCT Filed: Mar. 8, 2012

(86) PCT No.: PCT/CA2012/050140
§ 371 (c)(1),
(2), (4) Date: Sep. 6, 2013

(87) PCT Pub. No.: WO2012/119257
PCT Pub. Date: Sep. 13, 2012

(65) Prior Publication Data
US 2013/0342017 A1 Dec. 26, 2013

Related U.S. Application Data

(60) Provisional application No. 61/450,833, filed on Mar. 9, 2011.

(51) Int. Cl.
*H02J 1/10* (2006.01)
*G05F 1/67* (2006.01)
(Continued)

(52) U.S. Cl.
CPC ............ *G05F 1/67* (2013.01); *H02M 7/48* (2013.01); *H02S 50/10* (2014.12); *H02J 3/385* (2013.01); *Y02E 10/58* (2013.01); *Y10T 307/50* (2015.04)

(58) Field of Classification Search
CPC ...... H02J 1/10; H02J 1/102; H02J 7/35; H02J 3/383; H02J 3/385; H02J 3/382; Y02E 10/58; Y02E 10/50
(Continued)

(56) References Cited

U.S. PATENT DOCUMENTS

| 5,892,354 | A | 4/1999 | Nagao et al. |
| 7,087,332 | B2 * | 8/2006 | Harris ............... G05F 1/67 323/271 |

(Continued)

FOREIGN PATENT DOCUMENTS

EP 0 653 692 A2 5/1995

OTHER PUBLICATIONS

PCT International Search Report and Written Opinion completed by the ISA/CA on May 8, 2012 and issued in connection with PCT/CA2012/050140.

(Continued)

*Primary Examiner* — Rexford Barnie
*Assistant Examiner* — Jagdeep Dhillon
(74) *Attorney, Agent, or Firm* — Barnes & Thornburg LLP

(57) ABSTRACT

Photovoltaic system maximum power point tracking methods and apparatus are disclosed. Output power samples from one or more photovoltaic (PV) cells are obtained. The output power samples include perturbed samples for which a perturbation is applied to an operating voltage or current of the PV cell(s) and non-perturbed samples for which no perturbation is applied to the operating voltage or current. A control output, to change the operating voltage or current of the PV cell(s) for a next perturbed sample by a next perturbation, is generated. The next perturbation could be based on an estimated change in output power due to a previous perturbation. The next perturbation could also or instead be in a direction based on a change in output power samples, and of a magnitude based on the direction and a direction of perturbations applied for one or more perturbed samples preceding the next perturbed sample.

20 Claims, 13 Drawing Sheets

(51) Int. Cl.
  *H02M 7/48* (2007.01)
  *H02S 50/10* (2014.01)
  *H02J 3/38* (2006.01)
(58) Field of Classification Search
  USPC ......... 307/43, 82, 80, 86, 9.1; 323/906, 303; 320/101, 102
  See application file for complete search history.

(56) References Cited

U.S. PATENT DOCUMENTS

| | | | | |
|---|---|---|---|---|
| 9,130,401 | B2* | 9/2015 | Adest | H01L 31/02021 |
| 2007/0035975 | A1* | 2/2007 | Dickerson | H02J 7/35 363/131 |
| 2008/0143188 | A1* | 6/2008 | Adest | H02J 1/102 307/82 |
| 2009/0020151 | A1 | 1/2009 | Fornage | |
| 2011/0001360 | A1* | 1/2011 | Rua' | H02J 7/35 307/60 |
| 2011/0273158 | A1* | 11/2011 | Mateu | H02M 3/156 323/303 |
| 2012/0075898 | A1* | 3/2012 | Sigamani | G05F 1/67 363/131 |

OTHER PUBLICATIONS

Zhang et al, "A Novel Two-mode MPPT Method for Photovoltaic Power Generation System", IEEE 6th International Power Electronics and Motion Control Conference, 2009, pp. 2100-2102. See abstract, section III. Figure 4.

Sera, et al. "Optimized Maximum Power Point Tracker for Fast-Changing Environmental Conditions", IEEE Transactions on Industrial Electronics, No. 7, Jul. 2008. See whole document.

Piegari, et al.. "Adaptive Perturb and Observe Algorithm for Photovoltaic Maximum Power Point Tracking". IET Renewable Power Generation, 2010, vol. 4, Issue 4, pp. 317-328.

Huang, et al., "A New Cost-Effective Analog Maximum Power Point Tracker for PV Systems". IEEE Energy Conversion Congrress and Exposition (ECCE), 2010, pp. 624-631.

Yafaoui, et al. "Implementation of Maximum Power Point Tracking Algorithm for Residential Photovoltaic Systems" 2nd Canadian Solar Biuldings Conference, Carlgary, Jun. 10-14, 2007.

Extended European Search Report issued on May 8, 2015 in respect of European Patent Office Application No. 12757718.9 (12 pages).

Ashish Pandey et al: "Design Issues in Implementing MPPT for Improved Tracking and Dynamic Performance", IEEE Industrial Electronics, IECON 2006—32nd Annual Conference On, IEEE, Piscataway, NJ, USA, Nov. 1, 2006 (Nov. 1, 2006), pp. 4387-4391.

Sera D et al: "Optimized Maximum Power Point Tracker for Fast-Changing Environmental Conditions", IEEE Transactions on Industrial Electronics, IEEE Service Center, Piscataway, NJ, USA, vol. 55, No. 7, Jul. 1, 2008 (Jul. 1, 2008), pp. 2629-2637.

Weidong Xiao et al: "A Modified Adaptive Hill Climbing MPPT Method for Photovoltaic Power Systems", Power Electronics Specialists Conference, 2004, PESC 04. 2004 IEEE 35th Annual, Aachen, Germany Jun. 20-25, 2004, Piscataway, NJ, USA, IEEE, US, vol. 3, Jun. 20, 2004 (Jun. 20, 2004), pp. 1957-1963.

Esram T et al: "Comparison of Photovoltaic Array Maximum Power Point Tracking Techniques", IEEE Transactions on Energy Conversion, IEEE Service Center, Piscataway, NJ, US, vol. 22, No. 2, Jun. 1, 2007 (Jun. 1, 2007), pp. 439-449.

\* cited by examiner

PHOTOVOLTAIC SYSTEM MAXIMUM POWER POINT TRACKING

CROSS REFERENCE TO RELATED APPLICATIONS

This application is a U.S. national counterpart application of international application serial No. PCT/CA2012/050140 filed Mar. 8, 2012, which claims priority to U.S. Provisional Patent Application No. 61/450,833 filed Mar. 9, 2011. The entire disclosures of PCT/CA2012/050140 and U.S. Ser. No. 61/450,833 are hereby incorporated by reference.

FIELD OF THE INVENTION

This invention relates generally to photovoltaic (PV) systems and, in particular, to maximum power point tracking for PV cells or modules in such systems.

BACKGROUND

Power output from PV cells varies according to their load current, the voltage at which they are operated, and stimulus or light level. Maximum Power Point (MPP) tracking techniques are intended to control operating voltages so that PV cells are operated at or near their maximum power points.

Some MPP tracking techniques, generally known as "perturb and observe" techniques, sample output power and change operating voltage depending on how the output power changes in successive sampling periods. However, some of these techniques do not differentiate between output power changes that are due to operating voltage changes and those that are due to changes in light level. Light level effects can result in incorrect adjustments to operating voltage, which increases convergence time and decreases effectiveness of the tracking algorithm.

Even in the absence of light level effects (i.e., constant irradiance), the pure "perturb and observe" algorithm will oscillate around the maximum power point with a given step, which would degrade the overall performance compared to the ideal maximum power point. Reducing the step to improve the static performance would degrade significantly the dynamic tracking capabilities of such an algorithm.

SUMMARY

A method includes: obtaining output power samples of power output from one or more photovoltaic (PV) cells, the output power samples comprising perturbed samples for which a perturbation is applied to an operating voltage or current of the one or more PV cells and non-perturbed samples for which no perturbation is applied to the operating voltage or current; and generating a control output to change the operating voltage or current of the one or more PV cells for a next perturbed sample by a next perturbation based on a difference between: (1) a change in output power between a non-perturbed sample and a perturbed sample preceding the non-perturbed sample, and (2) a change in output power between the perturbed sample preceding the non-perturbed sample and a sample preceding the perturbed sample.

In some embodiments, the next perturbation is in a direction based on the change in output power between the perturbed sample preceding the non-perturbed sample and the sample preceding the perturbed sample.

The next perturbation could be of a magnitude based on a number of changes in direction of the perturbations applied for one or more perturbed samples preceding the next perturbed sample. For example, the magnitude of the next perturbation could be one of: a first magnitude where the direction of the next perturbation is different from the direction of the perturbation applied for the perturbed sample preceding the non-perturbed sample; and a second magnitude where there was no change in the direction of the perturbations applied for the perturbed samples in the predetermined number of preceding perturbed samples. In one embodiment, the first magnitude is a fraction of the magnitude of the perturbation applied for the perturbed sample preceding the next perturbed sample, and the second magnitude is an integer multiple of the magnitude of the perturbation applied for the perturbed sample preceding the next perturbed sample.

The method might also include changing the operating voltage or current of the one or more PV cells by the next perturbation.

The output power samples may include multiple consecutive perturbed samples, multiple consecutive non-perturbed samples, or both multiple consecutive perturbed samples and multiple consecutive non-perturbed samples.

In some embodiments, the change in output power between the non-perturbed sample and the perturbed sample preceding the non-perturbed sample is based on multiple consecutive non-perturbed samples including the non-perturbed sample and one or more further non-perturbed samples following the perturbed sample.

The generating may involve generating the control output to increase the operating voltage or decrease the operating current responsive to the operating voltage being below a minimum operating voltage.

An apparatus is also provided, and includes one or more PV cells; and a tracking module, operatively coupled to the one or more PV cells, to obtain output power samples of power output from the one or more PV cells, the output power samples comprising perturbed samples for which a perturbation is applied to an operating voltage or current of the one or more PV cells and non-perturbed samples for which no perturbation is applied to the operating voltage or current; and to generate a control output to change the operating voltage or current of the one or more PV cells for a next perturbed sample by a next perturbation based on a difference between: (1) a change in output power between a non-perturbed sample and a perturbed sample preceding the non-perturbed sample, and (2) a change in output power between the perturbed sample preceding the non-perturbed sample and a sample preceding the perturbed sample.

As noted above, the next perturbation could be in a direction based on the change in output power between the perturbed sample preceding the non-perturbed sample and the sample preceding the perturbed sample, and of a magnitude based on a number of changes in direction of the perturbations applied for one or more perturbed samples preceding the next perturbed sample. Examples of a first magnitude and a second magnitude are provided above.

In some embodiments, the apparatus also includes a power converter operatively coupled to the one or more PV cells, in which case the tracking module may control the operating voltage or current of the one or more PV cells by controlling operation of the power converter.

The apparatus could include a memory, operatively coupled to the tracking module, to store records of one or more of: the output power samples; changes in output power between the output power samples; and directions of perturbations for the perturbed samples.

Where a power converter is operatively coupled to the one or more PV cells, a controller to control operation of the power converter could include the tracking module.

The tracking module may change the operating voltage or current of the one or more PV cells by the next perturbation, in some embodiments.

As noted above, the output power samples could include multiple consecutive perturbed samples, multiple consecutive non-perturbed samples, or both multiple consecutive perturbed samples and multiple consecutive non-perturbed samples.

The tracking module could generate the control output to increase the operating voltage or decrease the operating current responsive to the operating voltage being below a minimum operating voltage.

According to another aspect of the present disclosure, a method includes: obtaining output power samples of power output from one or more PV cells, the output power samples comprising perturbed samples for which a perturbation is applied to an operating voltage or current of the one or more PV cells; and generating a control output to change the operating voltage or the operating current of the one or more PV cells for a next perturbed sample by a next perturbation, the next perturbation being in a direction based on a change in output power samples, and of a magnitude based on the direction and a direction of perturbations applied for one or more perturbed samples preceding the next perturbed sample.

The magnitude could be a magnitude determined by applying an adjustment to a magnitude applied for a most recent perturbed sample preceding the next perturbed sample. In some embodiments, the magnitude of the next perturbation is a minimum value where the magnitude determined by applying the adjustment is below the minimum value, and the magnitude of the next perturbation is a maximum value where the magnitude determined by applying the adjustment is above the maximum value.

The method could also include changing the operating voltage or current of the one or more PV cells by the next perturbation.

In some embodiments, the generating involves generating the control output to increase the operating voltage or decrease the operating current responsive to the operating voltage being below a minimum operating voltage.

Another aspect provides an apparatus that includes: one or more PV cells; and a tracking module, operatively coupled to the one or more PV cells, to obtain output power samples from the one or more PV cells, the output power samples comprising perturbed samples for which a perturbation is applied to an operating voltage or current of the one or more PV cells; and to generate a control output to change the operating voltage or the operating current of the one or more PV cells for a next perturbed sample by a next perturbation, the next perturbation being in a direction based on a change in output power samples, and of a magnitude based on the direction and a direction of perturbations applied for one or more perturbed samples preceding the next perturbed sample.

As noted above, the magnitude could be a magnitude determined by applying an adjustment to a magnitude applied for a most recent perturbed sample preceding the next perturbed sample, a minimum value where the magnitude determined by applying the adjustment is below the minimum value, or a maximum value where the magnitude determined by applying the adjustment is above the maximum value.

The tracking module could change the operating voltage or current of the one or more PV cells by the next perturbation.

In some embodiments, the tracking module generates the control output to increase the operating voltage or decrease the operating current responsive to the operating voltage being below a minimum operating voltage.

Other aspects and features of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
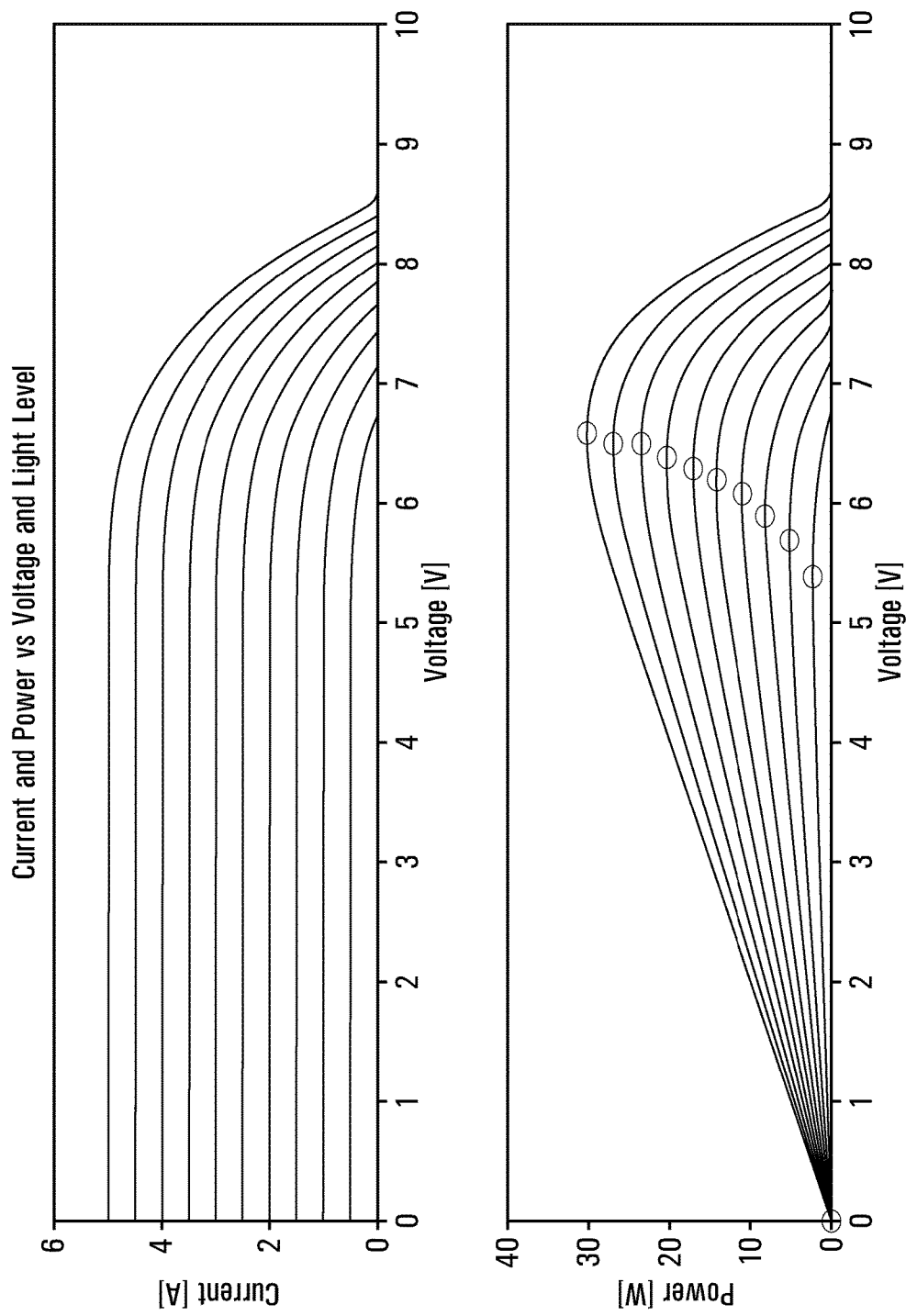
FIG. 1 includes current and power plots illustrating example characteristics of a generic model for a PV module including one or more PV cells.

As noted above, output power from a PV cell varies depending on load current, operating voltage, and light level. FIG. 1 includes current and power plots illustrating example characteristics of a generic model for a PV module including one or more PV cells. Actual implementations may exhibit different characteristics than shown in FIG. 1, although current and power characteristic curves with similar shapes would generally be expected.

Each curve in the current versus voltage plot at the top of FIG. 1 and each curve in the power versus voltage plot at the bottom of FIG. 1 represents different irradiance levels. The MPP for each curve is circled in the power versus voltage plots.

Figure 4:
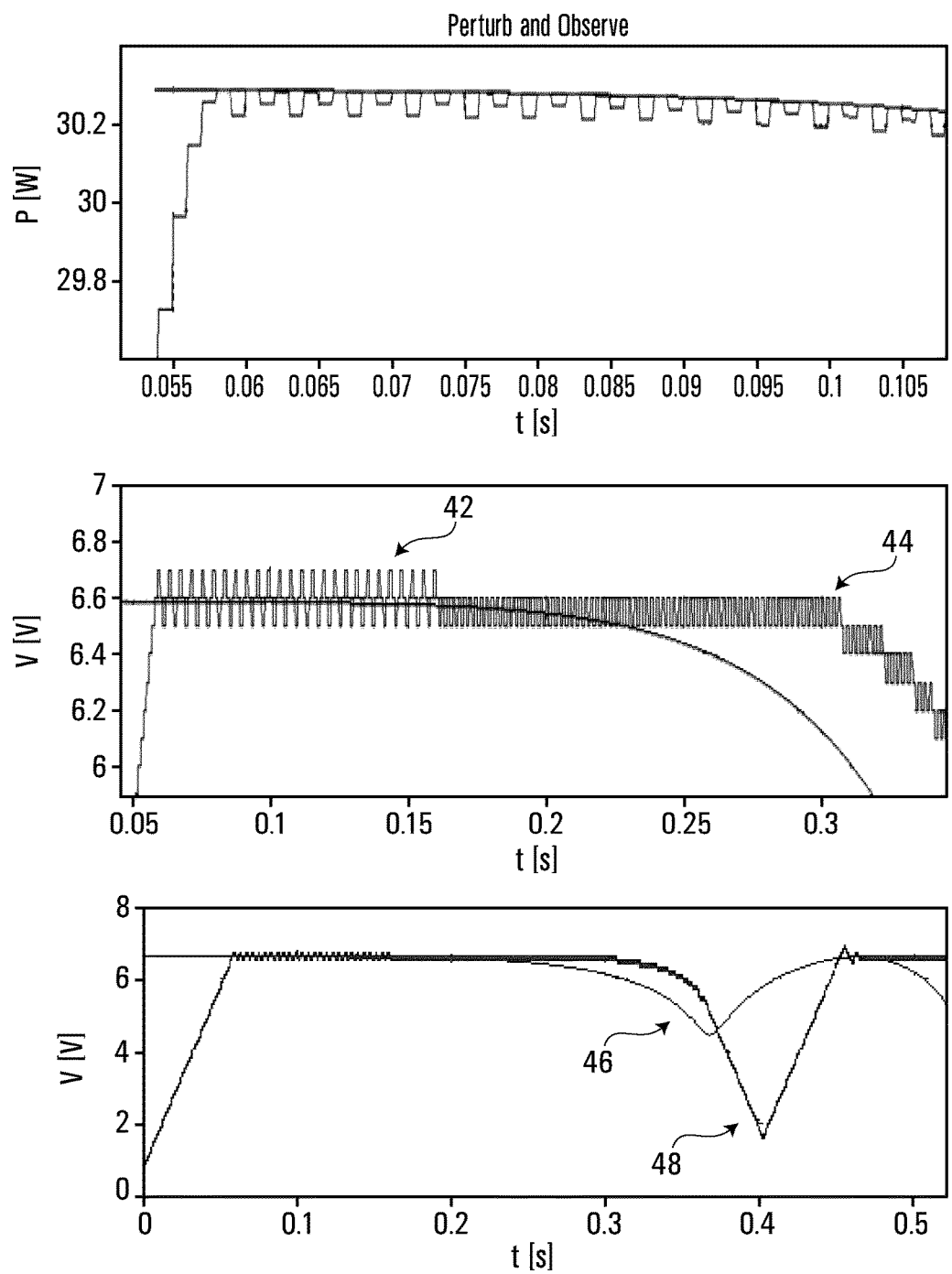
FIG. 4 includes example simulation plots of power and operating voltage on different power, voltage, and time scales than FIG. 3.

The concept behind the perturb and observe method of MPP tracking is to modify the operating voltage or current of a PV cell, or a PV module that includes one or more PV cells, until maximum power is obtained. For example, if increasing the operating voltage of a PV cell increases the power output, then the operating voltage is increased until the power output begins to decrease. Once this happens, the voltage is decreased to get back to the maximum power output value. This process continues until the maximum power point is reached. Then, under static conditions, the voltage oscillates indefinitely around the optimal value point in an up-up-down-down-up-up-down-down . . . type of sequence, placing the actual power point to the left-mid-right-mid-left-mid . . . of the ideal MPP (as shown in FIG. 4 at 42). Perturb and observe is the most commonly used MPP tracking method due to its ease of implementation.

Figure 2:
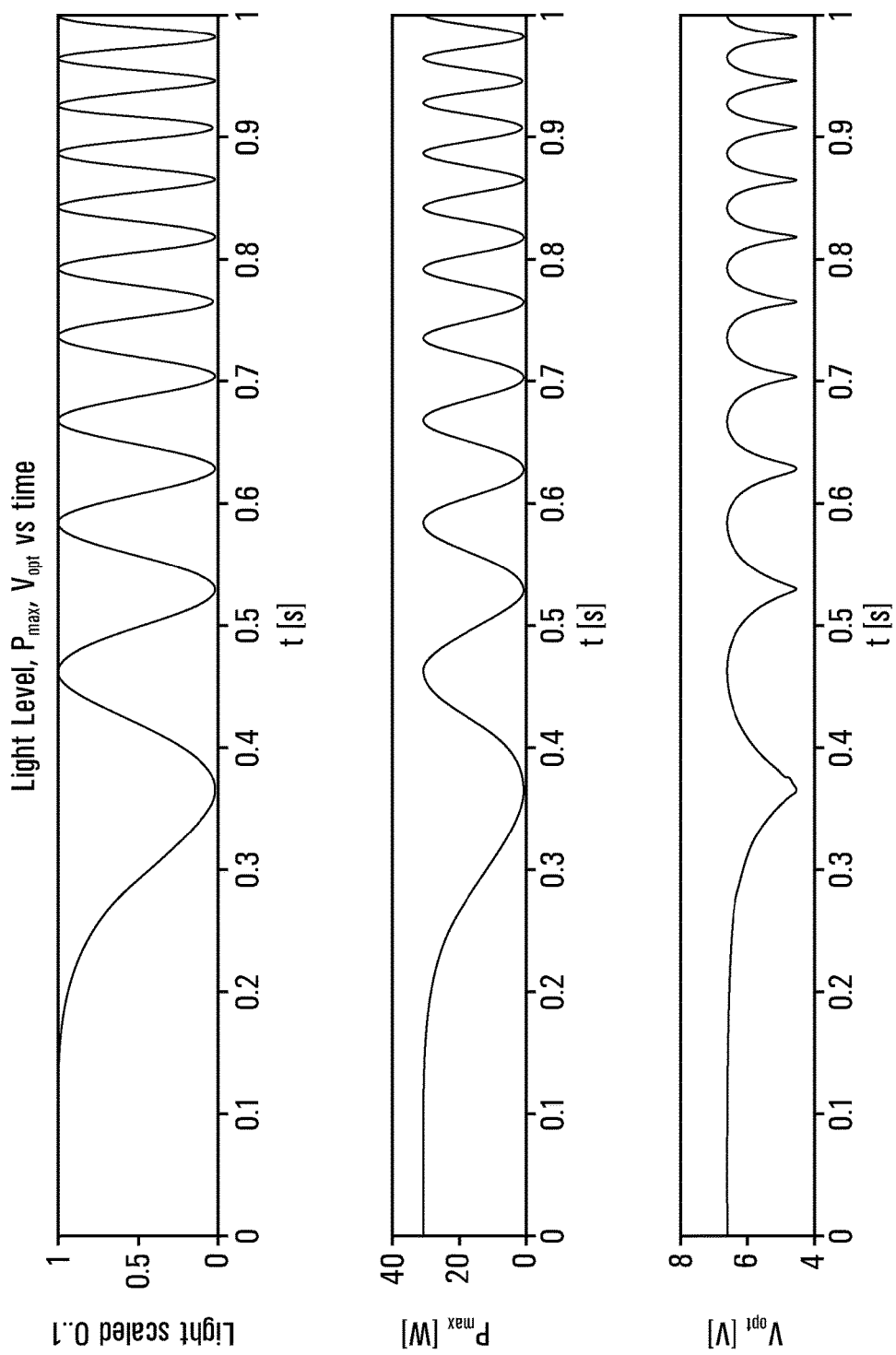
FIG. 2 includes example simulation plots of an example light level modulation and resultant changes in maximum power ($P_{max}$) and optimal operating voltage ($V_{opt}$) at the MPP.

FIG. 2 includes example simulation plots of an example light level modulation and resultant changes in maximum power ($P_{max}$) and optimal operating voltage ($V_{opt}$) at the MPP. The light level scenario shown at the top of FIG. 2 represents a "chirp" signal to evaluate the time response of MPP tracking algorithms. The chirp signal starts at a light scaling level of 1 (100% irradiation), and then varies between 1 and 0 at an increasing frequency. The middle plot shows the theoretical maximum power obtainable under the irradiance scenario presented in the top plot, and the lower plot shows the theoretical operating voltage of the panel in order to extract the maximum power.

It should be noted that the plots shown in FIG. 2, as well as all other plots shown in the drawings, were generated through simulation. In the case of FIG. 2, the simulation conditions are as follows: simulation time step=0.0001s; total simulation time=1s; sampling time step=0.001s (power measurement every 1 ms), and a certain voltage (which can be incrementally adjusted) is applied to a PV cell modelled using the curves shown in FIG. 1 in order to extract maximum power from it. The voltage step was 0.1V, and the voltage starting point was 1V. Similar or different results could be observed under other simulation conditions and/or with actual implementations.

Figure 3:
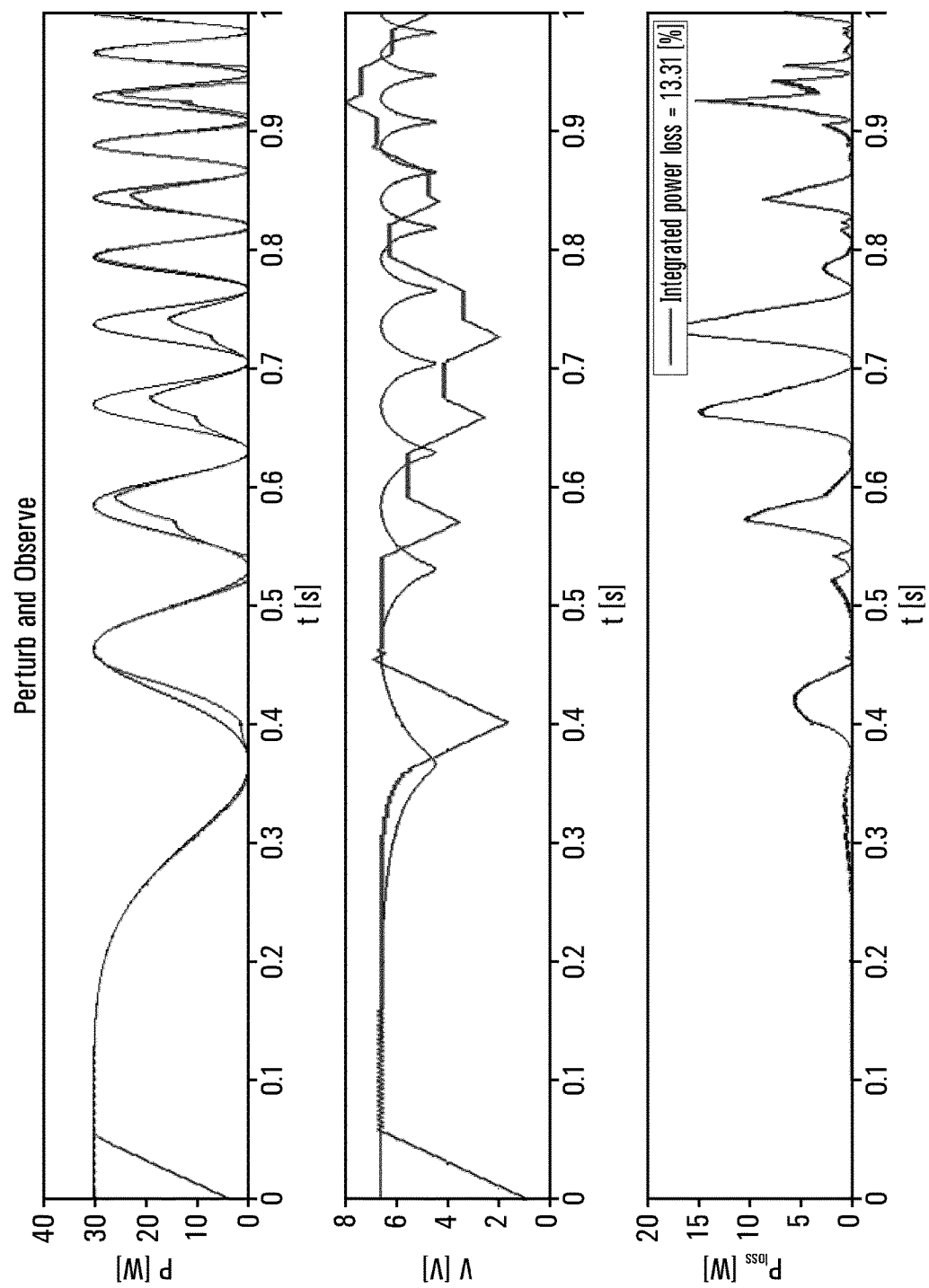
FIG. 3 includes example simulation plots of power, operating voltage, and power loss ($P_{loss}$) versus time using a pure "perturb and observe" technique.

FIG. 3 includes example simulation plots of power, operating voltage, and power loss ($P_{loss}$) versus time. The top and middle plots in FIG. 3 show the "ideal" power and voltage curves from FIG. 2, and actual curves obtained by simulating a perturb and observe MPP tracking mechanism. An MPP tracking mechanism should closely track the ideal power and voltage curves. For the purposes of $P_{loss}$, in the lower plot in FIG. 3, the first 0.1s period is masked, to prevent a large error during initial convergence from overshadowing subsequent power loss values after initial convergence, when the MPP tracking algorithm should be tracking the ideal curves. The subsequent power loss is a better indicator of the effectiveness of MPP tracking. As shown, in this example $P_{loss}$ is 13.31%, which means that power output is 13.31% lower than the maximum power that could be obtained from the simulated system.

Referring now to FIG. 4, which includes example simulation plots of power and operating voltage on different power, voltage, and time scales than FIG. 3, it can be seen from the upper plot that, for quasi-static light level during a very short time interval on the order of 0.1s, the algorithm converges to the optimal voltage and oscillates around it. This is also shown at 42 in the middle plot of FIG. 4. If the power starts to drop due to light level reduction, then in every sampling period the power is decreasing and the algorithm changes the sign of the operating voltage step at every sample. Therefore, the operating voltage oscillates around a fixed value, as shown at 44, and does not follow the optimal voltage.

On the other hand, if the power increases due to light level more than it would have decreased due to the voltage change, then the voltage may keep moving in the same direction—right or wrong. Referring to FIG. 4, arrow 48 shows the generated voltage moving down (wrong direction), while the ideal voltage is moving up at 46.

A conventional perturb and observe algorithm cannot distinguish how much of the power variation is due to the change in voltage (generated by the algorithm) and how much is due to the change in light level.

According to one embodiment, output power is measured in every sampling period, but operating voltage, or current, is changed after only every other sample. The power variation between samples where there was no change in voltage or current would be due to a change in light only. If one expects about the same rate of change of light level between two consecutive samples, then when power is measured after a change in voltage or current, the variation due to light change (linear prediction based on the previous sample) is subtracted from the current sample, to determine the power variation due to the change in voltage or current. In this type of tracking technique, the adjustment or correction in voltage or current is applied at half rate with respect to the sampling rate.

Another embodiment involves an adaptive step for adjusting the operating voltage or current. If, for a given number of consecutive samples, the voltage or current has been moving in the same direction, then the step size could be doubled, for example. When the step changes sign or direction, then the step size could similarly be decreased by half. Minimum and maximum limits for the step size, and/or minimum and maximum limits for voltage and current, could be imposed to ensure stability.

Figure 5A:
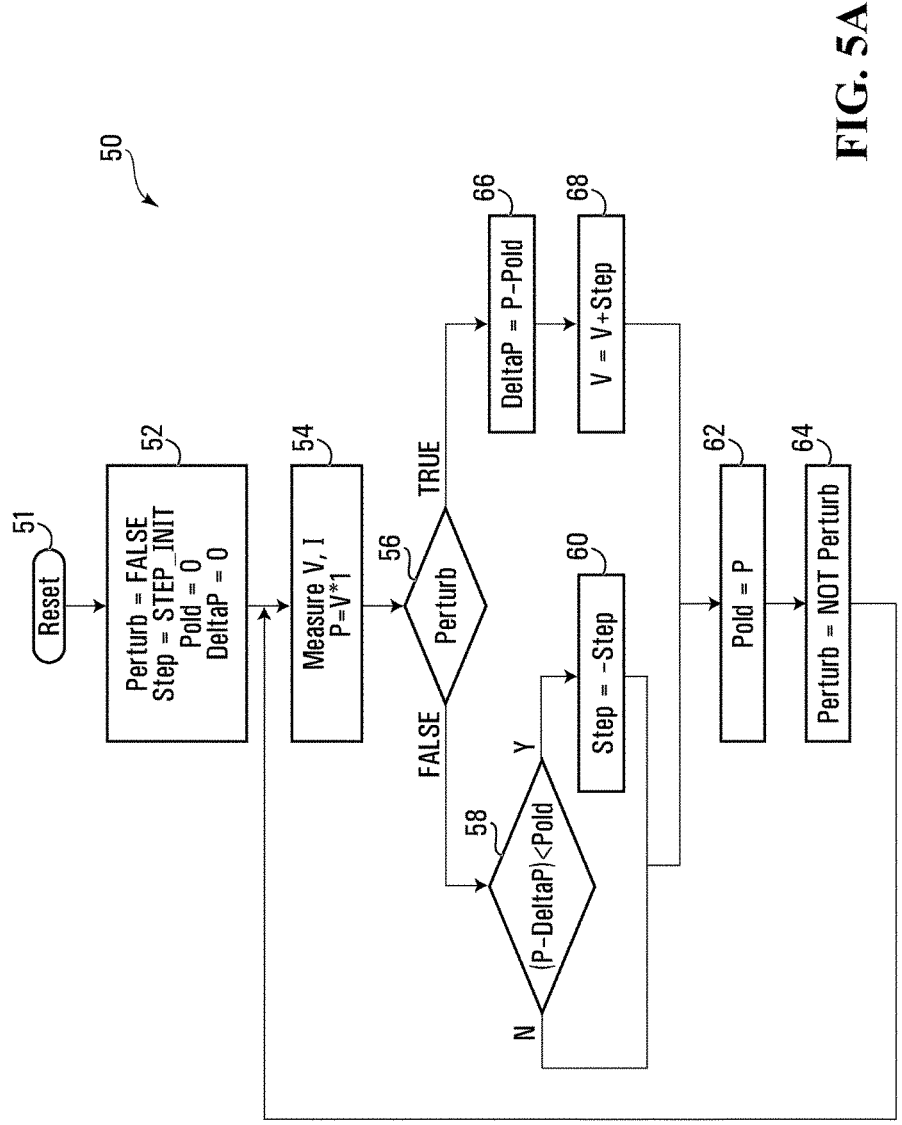
FIG. 5A is a flow diagram of an example method.

FIG. 5A is a flow diagram of an example method. The example method 50 represents an improved perturb and observe approach, with linear prediction. Output power samples are obtained, which could involve sampling voltage and current measurements and calculating output power from the voltage and current samples, from one or more PV cells, but a perturbation is applied to the operating voltage of the PV cell(s) for only every other power sample. Although the example method 50 and the example method 70 (FIG. 5B) refer to voltage perturbations, the MPP tracking techniques disclosed herein could involve perturbing either the operating voltage or the operating current of the PV cell(s).

The "Reset" at block 51 and the initializations at block 52 in the example method 50 relate to initial startup of the example method. After the general initializations at 52, an output power sample P is calculated at 54 based on voltage and current measurements. The initial values for the variables at 52 are chosen in such way that at the very first sample after initialization, the only actions which are performed are setting Pold with the initial power sample at 62 and setting Perturb to TRUE at 64 (via the "No" path at 58). An initial value of the operating voltage might also or instead be chosen at startup, so that tracking begins at a point that is closer to an expected MPP than a zero or other initial value. This could improve initial convergence toward the MPP.

A new power sample P is obtained at 54, and in this cycle Perturb is "True" at 56. DeltaP is calculated at 66, and represents the power variation due to a change in irradiation, since in the previous cycle no perturbation to the operating voltage was performed. After the power sample based on the voltage and current measurements is obtained, the operating voltage V of the PV cell(s) is perturbed by adding the perturbation "Step" at 68. The initial direction and size of the step have no relation to preceding samples in the first pass through the "True" path at 56 since there is only one preceding sample at this point. However, the choice of a value for the size of the step could speed up the initial response of the example method 50. Pold is now set to the current output power sample P at 62, and Perturb is set to FALSE at 64.

Another power sample is obtained at 54. This power sample would be a perturbed sample, in that a perturbation is applied to the operating voltage at 68 prior to the present power sample being obtained. The perturbation is applied at 68 sufficiently prior to the voltage and current measurements at 54 so that the effect of the perturbation on output power is realized before those measurements are taken and the power sample is obtained. Thus, a perturbed power sample that is obtained after a perturbation is applied captures the effect of the perturbation on output power. This type of temporal relationship between perturbations and subsequent perturbed power samples applies not only to voltage perturbation embodiments, but also to embodiments in which current perturbations are used in MPP tracking.

In one embodiment, power samples are taken periodically with a fixed sampling period, and the perturbation is applied at 68 immediately after a non-perturbed sample is obtained at 54. The next power sample, which is a perturbed power sample for which the perturbation was applied at 68, is then obtained at 54 substantially one sample period after the perturbation is applied. The sampling period and the wait period for the perturbation to take effect are substantially the same in this embodiment, and thus sampling control can also provide sufficient time for the perturbation to impact output power.

After the power sample is obtained at 54, the previously calculated DeltaP (due to light variation) is subtracted from P, and the result is compared against Pold at 58. If (P-DeltaP) is smaller than Pold, then the sign of the step is flipped (i.e., the direction of the next perturbation changes from the previous perturbation) at 60. In other words, the direction or polarity of the perturbation changes if the change in output power due to the previous perturbation is negative. DeltaP removes, from the present power sample, an estimate of any change in output power due to light level changes, and (P-DeltaP) is thus an estimate of the output power change due only to the perturbation.

No perturbation is applied in this cycle. At the end of the cycle, Pold is set to the present power sample P at 62 and Perturb is set to TRUE at 64.

The next "Perturb=TRUE" cycle is similar to the previous cycle for this path, except that the sign of the step (i.e., the direction of the perturbation) may have been changed at 60.

The example method 50 repeats, alternating between the paths at 56. Thus, in the example shown, samples alternate between perturbed samples after a perturbation has been applied at 68, and non-perturbed samples where no perturbation has been applied.

It should be appreciated, however, that a sample pattern need not alternate between all consecutive samples. For example, a tracking mechanism could operate on a perturbed/perturbed/non-perturbed sequence. The "False" path at 56 would then be followed only once every three sample periods instead of in every other sample period. Also, in this scenario DeltaP might be calculated at 66 only for a first pass through the "True" path at 56 after a non-perturbed sample is obtained at 54, and the Perturb variable is inverted at 64 in the second pass through this path after a non-perturbed sample is obtained. The same perturbation could be applied for both passes through the "True" path after a non-perturbed sample is obtained, or a perturbation for the second pass could be determined based on a difference between the non-perturbed sample obtained at the start of the first pass and the perturbed sample obtained at the start of the second pass, for example.

A tracking mechanism could also or instead employ multiple consecutive non-perturbed samples. Embodiments described above use a linear prediction. This prediction or estimate is based on the change in power observed after a non-perturbed sample, which is due to light change only and is assumed to be practically the same for the next sampling period, when a perturbation is to be applied. This approach works well when the rate of change in irradiance (first derivative) is quasi-constant. When the rate of change in irradiance is not constant, a second order prediction could be implemented. This would involve applying a perturbation every 3 samples and using the previous 2 samples to calculate the first and second derivatives of the power variation due to irradiance. More generally, a perturb sample period in which a perturbation is applied could be followed by multiple observe sample periods to develop a higher order prediction as to a change in power caused by light change.

Figure 5B:
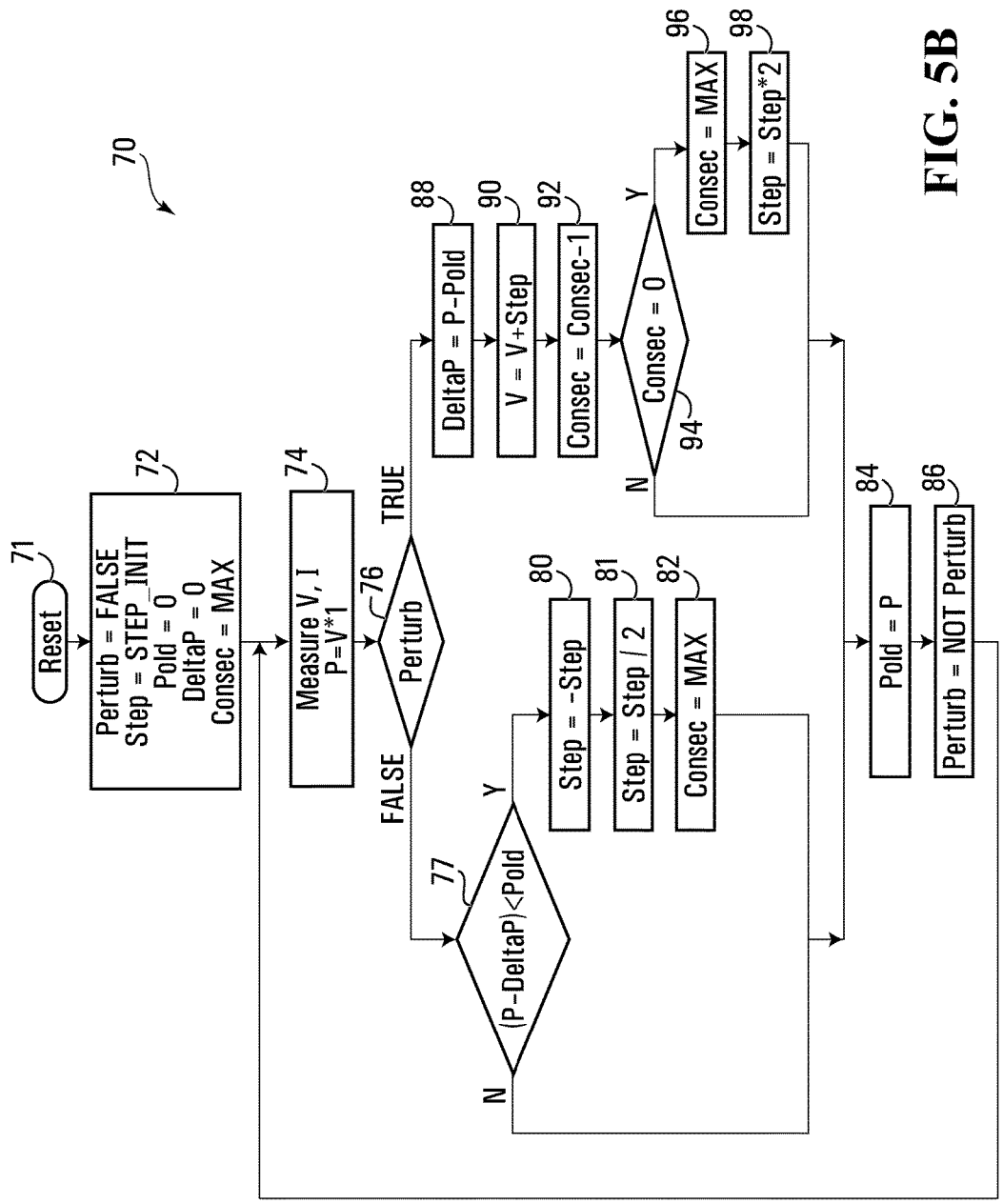
FIG. 5B is a flow diagram of another example method.

Turning to FIG. 5B, another example method 70 is shown. The example method 70 is similar to the example method 60, and includes operations at 71, 72, 74, 76, 77, 80, 84, 86, 88, 90, which correspond to those shown at 51, 52, 54, 56, 58, 60, 62, 64, 66, 68 in FIG. 5A. However, the example method 70 involves an additional variable Consec and some additional operations to provide for an adaptive step size for perturbations.

For sample 0, which is the first sample after start-of-life ("Reset") at 71 and initialization at 72, an output power sample P is calculated at 74 based on voltage and current measurements. As in FIG. 5A, the initial values at 72 could be chosen such that at sample 0 the only actions which are performed in the example method 70 are setting Pold with the actual output power sample at 84 and setting Perturb to TRUE at 86.

For sample 1, a new power sample P is obtained at 74, and DeltaP is calculated at 88. The operating voltage V is perturbed by adding the perturbation "step" at 90. The variable Consec is decremented at 92. The initial direction and size of the step have no relevance at this point during initial startup, but could be chosen to speed up the initial response of the tracking. If, after a number (MAX) of consecutive perturb cycles the sign of the step (i.e., the direction of the perturbation) has not changed, as determined at 94, then the value of the step is doubled at 98, up to a maximum value in some embodiments. The adjusted step value could be compared to the maximum step value after 98 and set to the maximum value if the adjusted step value exceeds the maximum value. The variable Consec is used in this determination at 94, and is reset to MAX at 96 whenever the step size is doubled. Pold is set to P at 84, and Perturb is set to FALSE at 86.

For sample 2, another power sample P is obtained at 74. DeltaP (due to light variation) is subtracted from P, and the result is compared against Pold at 78. If (P-DeltaP) is smaller than Pold, then the sign of the step is changed at 80, and the size of the step is halved at 81, but is not decreased below a minimum value in some embodiments. For instance, the adjusted step value could be compared to the minimum step value after 81 and set to the minimum value if the adjusted step value is below the minimum value. Consec is reset to MAX at 82. Pold is set to P at 84, and the Perturb flag is set to TRUE at 86.

The cycle for sample 3 is similar to sample 1, except that the sign of the perturbation "step" may have been changed at sample 2.

For sample 4, the cycle is similar to sample 2.

Although in the example method 70 the step is doubled or halved, any other strategy may be chosen. For example, the step size could be increased or decreased with a fixed quantity, different multiplication/division factors could be applied depending on how long the sign of the step has remained the same (e.g., a higher factor could be applied the longer the sign remains the same), etc. These are all examples of adjustments that could be applied to a previous perturbation magnitude (step size), in order to determine a next perturbation.

It should also be appreciated that linear estimation and/or adaptive step size could be implemented differently than shown. For example, changes in the sign of the step are tracked using the variable Consec, which is decremented in the example method 70. An incrementing counter arrangement could instead be used for this purpose. According to another possible variation, as noted above with reference to FIG. 5A, the example method 70 could potentially be applied to a tracking mechanism in which all consecutive samples do not necessarily alternate between perturbed and non-perturbed samples.

A minimum and/or a maximum value could be set for the step size, as noted above. Operating voltage could also or instead be subject to a minimum value and/or a maximum value. For example, where electronics in which MPP tracking is implemented are powered from the PV cell(s), in low light conditions voltage at the PV cell maximum power point could be too low to run the electronics. This potential issue could be addressed by halting MPP tracking if voltage decreases below a certain level. A check of voltage could be made after 54/74 in FIGS. 5A/5B, for instance, and if $V<V_{min}$ then voltage could be increased regardless of whether MPP tracking would apply a perturbation to decrease the operating voltage. V and I could then be measured again, and this loop of checking V against $V_{min}$ and increasing V could continue to execute until V is no longer below $V_{min}$. Another option for addressing this potential issue would be to provide the MPP tracking electronics with a different power supply, such as a battery or power from a power grid connected to the PV panel(s).

FIGS. 5A and 5B are flow diagrams of example methods that involve operating voltage perturbations. The example methods represented by the flow diagrams in FIGS. 6A and 6B are similar to those in FIGS. 5A and 5B but involve current perturbations instead of voltage perturbations.

Figure 6A:
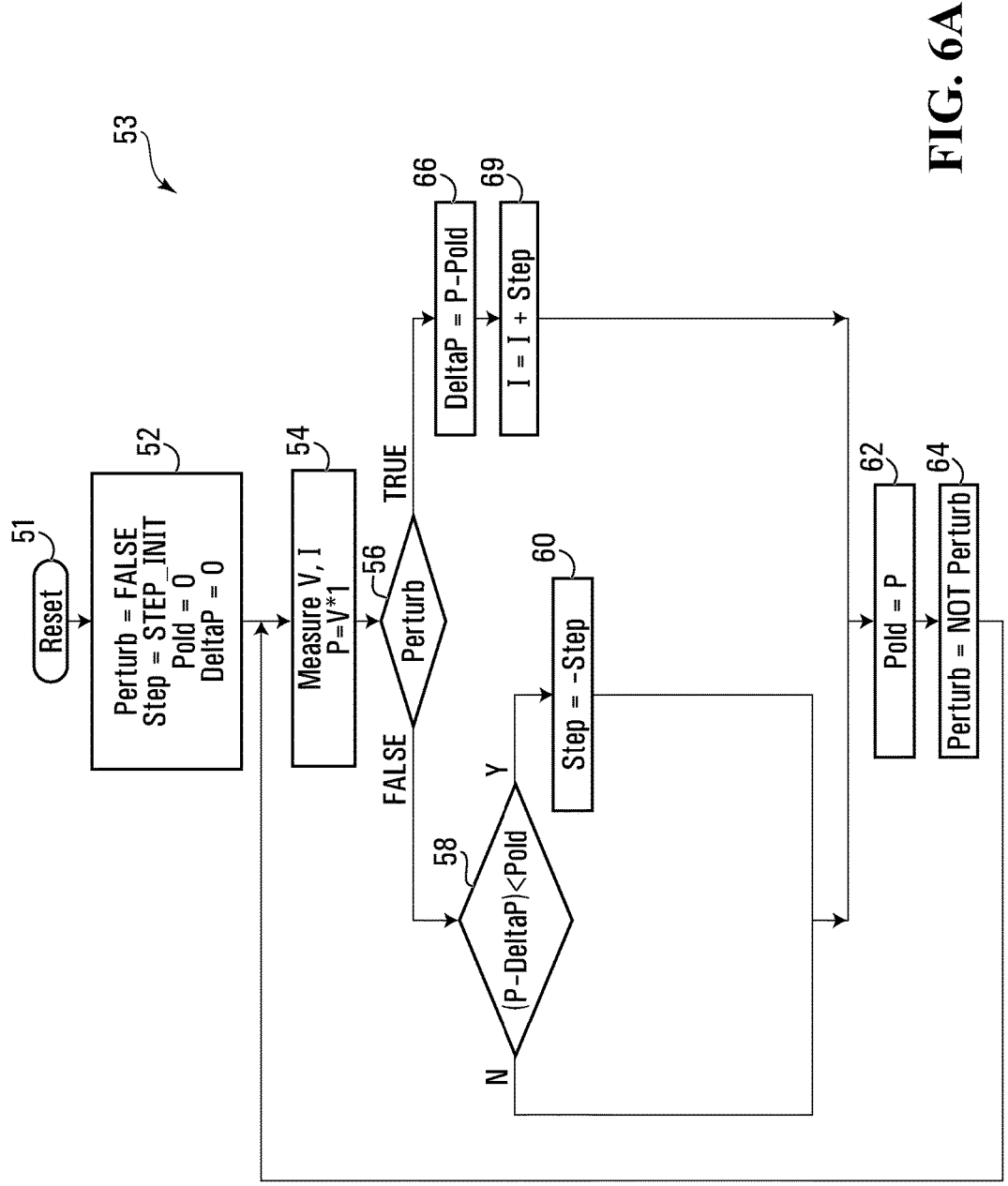
FIGS. 6A and 6B are flow diagrams of example methods similar to those in FIGS. 5A and 5B but using current perturbations instead of voltage perturbations.

The example method 53 in FIG. 6A represents a perturb and observe approach with prediction, and includes the operations at 51, 52, 54, 56, 58, 60, 62, 64, 66 which have been discussed in detail above. In the example method 53, however, the Step is a perturbation in load current, and the perturbation is applied to load current at 69 in FIG. 6A. The example method 53 otherwise operates as described above. Output power samples are obtained, and a perturbation is applied to the load current of the PV cell(s) for only every other power sample in this example.

Figure 6B:
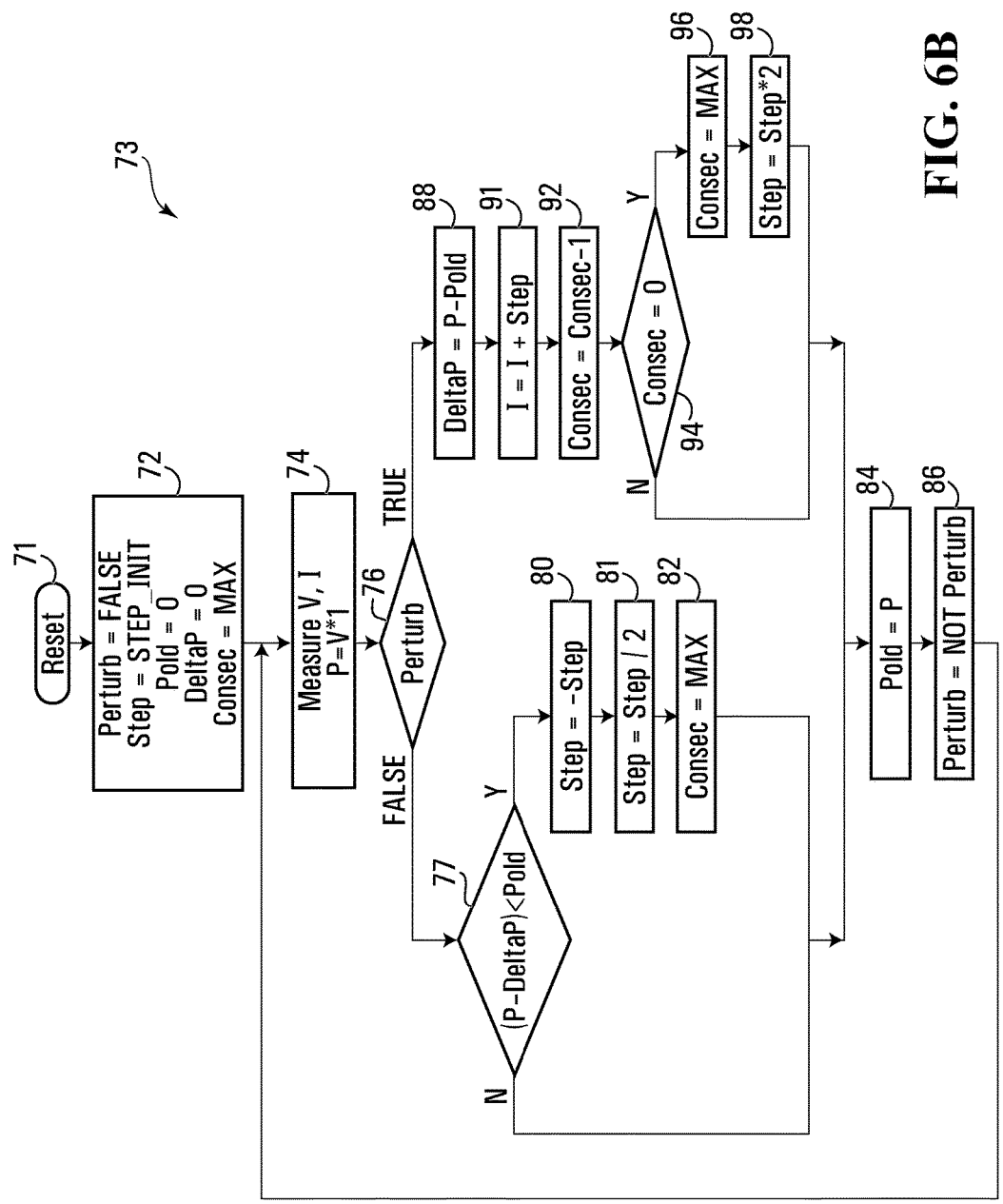

With reference to FIG. 6B, the example method 73 is substantially identical to the example method 70, and includes the operations at 71, 72, 74, 76, 77, 80, 81, 82, 84, 86, 88, 92, 94, 96, 98 which have been discussed in detail above. As noted above for FIG. 6A, the Step in the example method 73 is a perturbation in load current, and the perturbation is applied to load current at 91 in FIG. 6B.

The variations in the example methods 50, 70 as described above also apply to the example methods 53, 75. For instance, a sample pattern need not alternate between perturbed and non-perturbed samples for all consecutive samples in MPP tracking based on load current perturbations. Minimum/maximum values could be applied to any or all of step size, operating voltage, and load current. The minimum voltage low light condition example described above could be applied in a current-based MPP tracking embodiment by checking voltage after 54/74 in FIGS. 6A/6B, and if $V<V_{min}$ then load current could be decreased regardless of whether MPP tracking would apply a perturbation to increase the load current. V and I could then be measured again, and this loop of checking V against $V_{min}$ and decreasing I could continue to execute until V is no longer below $V_{min}$.

Features of voltage-based embodiments apply equally to current-based embodiments.

FIGS. 5A, 5B, 6A, and 6B provide detailed examples of MPP tracking methods. In a more general sense, a method according to an embodiment of the invention might include obtaining output power samples of power output from one or more PV cells. The output power samples include perturbed samples for which a perturbation is applied to an operating voltage or current of the PV cell(s) and non-perturbed samples for which no perturbation is applied to the operating voltage or current. A control output, to change the operating voltage or current of the PV cell(s) for a next perturbed sample by a next perturbation, is generated. In an embodiment that employs estimation or prediction of changes in output power due to irradiation of the PV cell(s), the next perturbation is based on a difference between: (1) a change in output power between a non-perturbed sample and a perturbed sample preceding the non-perturbed sample, and (2) a change in output power between the perturbed sample preceding the non-perturbed sample and a sample preceding the perturbed sample. The output power change (1) is an estimate or prediction of the output power change due to a change in irradiation.

The next perturbation may be in a direction based on the change in output power between the perturbed sample preceding the non-perturbed sample and the sample preceding the perturbed sample. This is shown at 58/60, 77/80. If output power drops, then the sign of the perturbation step (i.e., the direction of the next perturbation) changes.

Adaptive step size could be implemented in combination with estimation or prediction of output power change due to changes in irradiation. The magnitude of the next perturbation could then be based on a number of changes in direction of the perturbations applied for one or more perturbed samples preceding the next perturbed sample. See, for example, 81, 98 in FIGS. 5B, 6B. These operations in the example methods 70, 73 also illustrate that the magnitude of the next perturbation (i.e., step size) could be a first magnitude where the direction of the next perturbation is different from the direction of the perturbation applied for the perturbed sample preceding the non-perturbed sample; and a second magnitude where there was no change in the direction of the perturbations applied for the perturbed samples in the predetermined number of preceding perturbed samples. The halving/doubling of step size at 81, 98 in the example methods 70, 73 is illustrative of adjustments that could be applied to a previous perturbation to determine magnitude of the next perturbation.

The example methods 50, 53, 70, 73 include changing operating voltage or current at 68, 90, 69, 91. As described in further detail below, changing operating voltage or current by the next perturbation could be direct, or indirect by applying the generated control output to a power converter or other element through which operating voltage or current can be changed. Generation of the control output might also take into account minimum and/or maximum limits on step size and/or operating voltage or current. For example, the control output could be generated to increase the operating voltage or decrease the operating current responsive to the operating voltage being below a minimum operating voltage in order to address potential concerns regarding low light conditions in embodiments where MPP tracking electronics are powered from the PV cell(s).

Adaptive step size could be provided independently of estimation or prediction of output power changes due to changes in irradiation.

Figure 7:
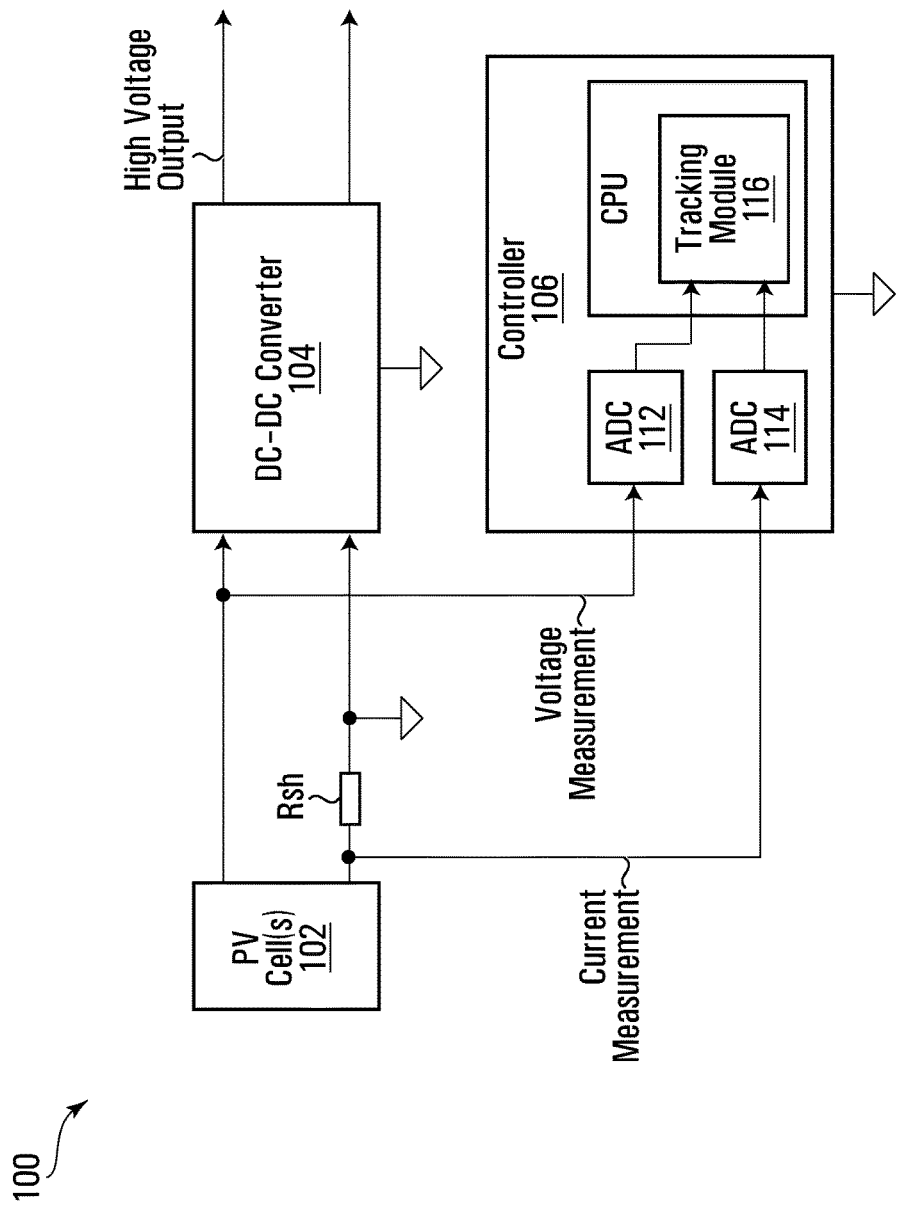
FIG. 7 is a block diagram of an example apparatus.

FIG. 7 is a block diagram of an example apparatus. The example apparatus 100 includes one or more PV cells 102, a power converter in the form of a DC-DC converter 104, and a controller 106. A PV module incorporating the apparatus 100 might include additional components as well, such as an electrical bus interface to enable the DC-DC converter 104 output to be connected to an electrical bus in a PV system.

The controller 106 in the example apparatus 100 includes a tracking module 116, although the tracking module could be provided separately from the controller in other embodiments. Since the controller 106 would normally monitor current and/or voltage at the output of the PV cell(s) 102 and control operation of the power converter 104, integration of MPP tracking into the controller 106 might enable existing measurement components and capabilities to be used for MPP tracking as well. Current measurement (via the resistance Rsh) and voltage measurement by the controller 106 are represented in FIG. 7. A microcontroller or other digital controller might also include analog to digital converters as shown at 112, 114, to convert analog measurements into digital values.

In a CPU-based implementation of the tracking module 116 and/or the controller 106, a memory (not shown) might be provided as well. Such a memory could be internal to the controller 106 or a separate component. One or more solid state memory devices and/or memory devices that use movable or even removable storage media could be used to implement such a memory.

In the example shown, the tracking module 116 is implemented using hardware in the form of the CPU, but could still involve software stored on one or more computer-readable storage media such as one or more memory devices as described above. Implementations involving firmware are also contemplated.

In operation, the tracking module 116 performs MPP tracking. The tracking module 116 could perform one of the example methods 50, 70 of FIGS. 5A, 5B or one of the example methods 53, 73 of FIGS. 6A, 6B, for instance. The current and voltage measurements are used to obtain output power samples, and the operating voltage or current of the PV cell(s) 102 can be controlled by controlling operation of the DC-DC converter 104. In this type of implementation, the operating voltage or current would not be directly changed. The "control element" which is changed could be the duty cycle of the Pulse Width Modulation (PWM) or the frequency, depending on the architecture of the DC-DC converter 104, of control signals that control operation of the converter. This in turn modifies the input voltage of the DC-DC converter 104 or the current that is extracted from the PV cell(s) 102 by the converter. This voltage and current are referred to as the operating voltage and current, which may be perturbed as described herein. Thus, it should be appreciated that perturbing and otherwise controlling operating voltage or current could be direct, or indirect through modifying a "control element" which consequently causes the voltage or current at the PV cell(s) 102 to change according to a transfer function depending on the DC-DC converter 104 architecture in the example apparatus 100.

In one embodiment, the tracking module 116 in the controller 106 operates to obtain output power samples of power output from the PV cell(s) 102, based on voltage and current measurements in the example apparatus 100. The output power samples include perturbed samples for which a perturbation is applied to an operating voltage or current of the PV cell(s) 102 and non-perturbed samples for which no perturbation is applied to the operating voltage or current. The tracking module 116 also operates to generate a control output to change the operating voltage or current of the PV cell(s) 102 for a next perturbed sample by a next perturbation based on a difference between: (1) a change in output power between a non-perturbed sample and a perturbed sample preceding the non-perturbed sample, and (2) a change in output power between the perturbed sample preceding the non-perturbed sample and a sample preceding the perturbed sample. The output power change (1) is an estimate or prediction of output power due to changes in irradiation of the PV cell(s) 102. The control output could be in the form of one or more control signals for controlling operating voltage or current. For example, the control output generated by the tracking module 116 could be in the form of a pair of control signals for controlling a pair of transistors in the DC-DC converter 104 in the example apparatus 100. Other forms of control outputs are possible, and the exact form of the control output would be dependent on how operating voltage or current control is implemented.

The next perturbation might be in a direction based on the change in output power between the perturbed sample preceding the non-perturbed sample and the sample preceding the perturbed sample. In adaptive step size embodiments, the next perturbation could be of a magnitude based on a number of changes in direction of the perturbations applied for one or more perturbed samples preceding the next perturbed sample. The magnitude of the next perturbation might be a first magnitude (such as a fraction of a previous perturbation magnitude in the example methods 70, 73 in FIGS. 5B, 6B) where there was a change in the direction of the perturbations applied for a predetermined number of preceding perturbed samples, or a second magnitude (such as an integer multiple of a previous perturbation magnitude in the example methods 70, 73) where there was no change in the direction of the perturbations applied for the perturbed samples in the predetermined number of preceding perturbed samples.

Adaptive step size need not necessarily be implemented in combination with estimation or prediction of output power changes due to changes in irradiation of the PV cell(s) 102. The tracking module 116 could operate to obtain output power samples of power output from the PV cell(s) 102, and to generate a control output to change the operating voltage or the operating current of the PV cell(s) for a next perturbed sample by a next perturbation, with the next perturbation being in a direction based on a change in output power samples, and of a magnitude based on the direction and a direction of perturbations applied for one or more perturbed samples preceding the next perturbed sample. The next perturbation in this case has an adaptive step size, but need not also take into account an estimate or prediction of output power change due to changes in irradiation.

The tracking module 116 may employ minimum and/or maximum limits on perturbation magnitude (step size), and/or operating voltage or current. For example, the tracking module 116 could generate the control output to increase the operating voltage or decrease the operating current responsive to the operating voltage being below a minimum operating voltage.

As noted above, the example apparatus 100 might also include a memory. Such a memory could be implemented using one or more memory devices, incorporated into the tracking module 116 and/or the controller 106. Memory could also or instead be provided in one or more separate memory devices operatively coupled to the tracking module 116. Records of the output power samples, changes in output power between the output power samples, and/or directions of perturbations for the perturbed samples could be stored in memory and accessed by the tracking module 116 for MPP tracking.

Figure 8:
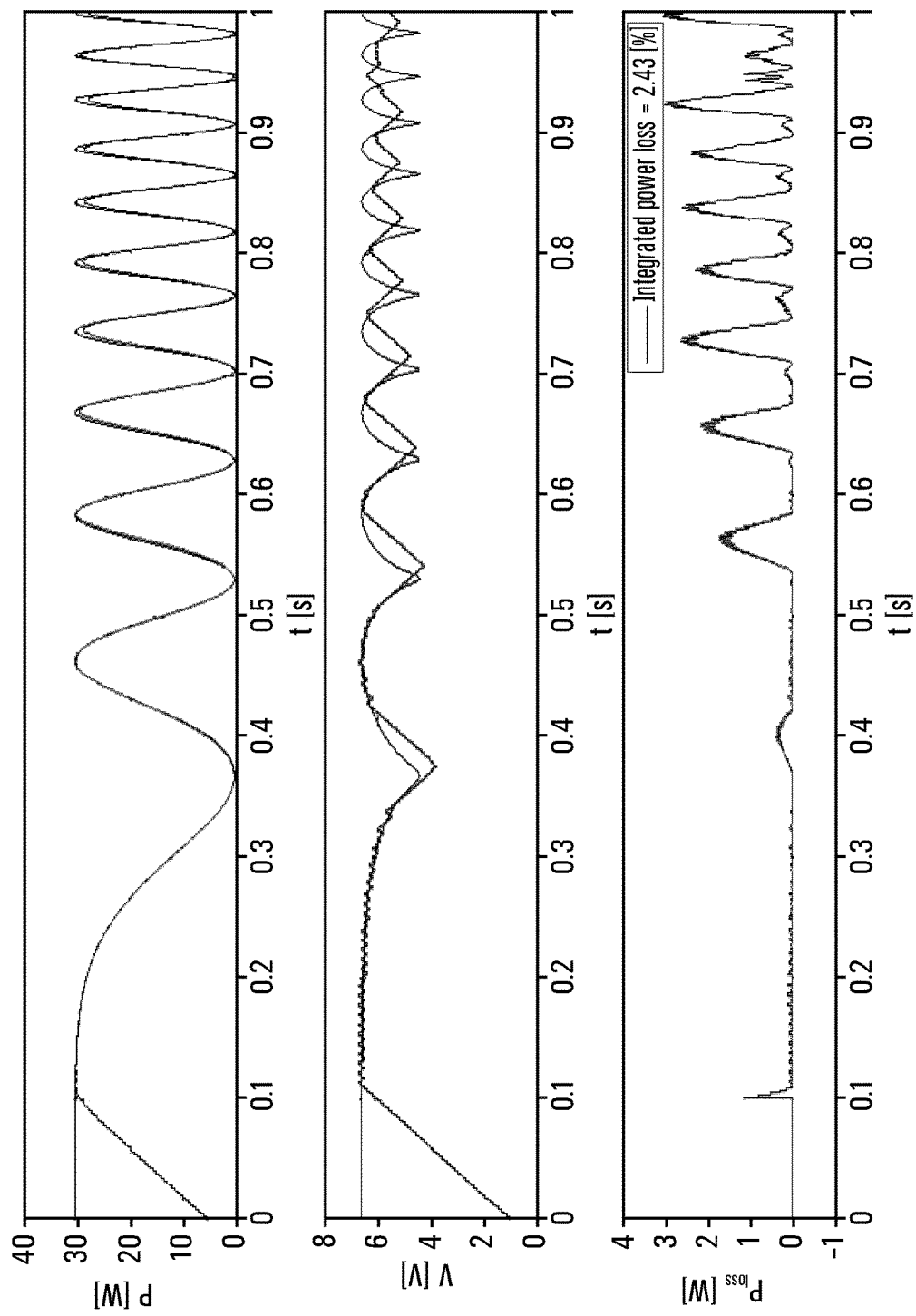
FIG. 8 includes example simulation plots of power, operating voltage, and power loss versus time, for an example perturb and observe technique with linear estimation.

FIG. 8 includes example simulation plots of power, operating voltage, and power loss versus time, for an example perturb and observe technique with linear estimation. Comparing the power and operating voltage plots in FIG. 8 with those in FIG. 3, it can be seen that initial convergence time is doubled, as would be expected since operating voltage is changed only half as often in some embodiments of a linear prediction approach, but MPP tracking after initial convergence is improved. The operating voltage plot in FIG. 8 does follow the ideal curve more closely than the perturb and observe curve in FIG. 3, but still has some slew-rate effects. Notably, $P_{loss}$ is considerably reduced, to 2.43% in this example.

Figure 9:
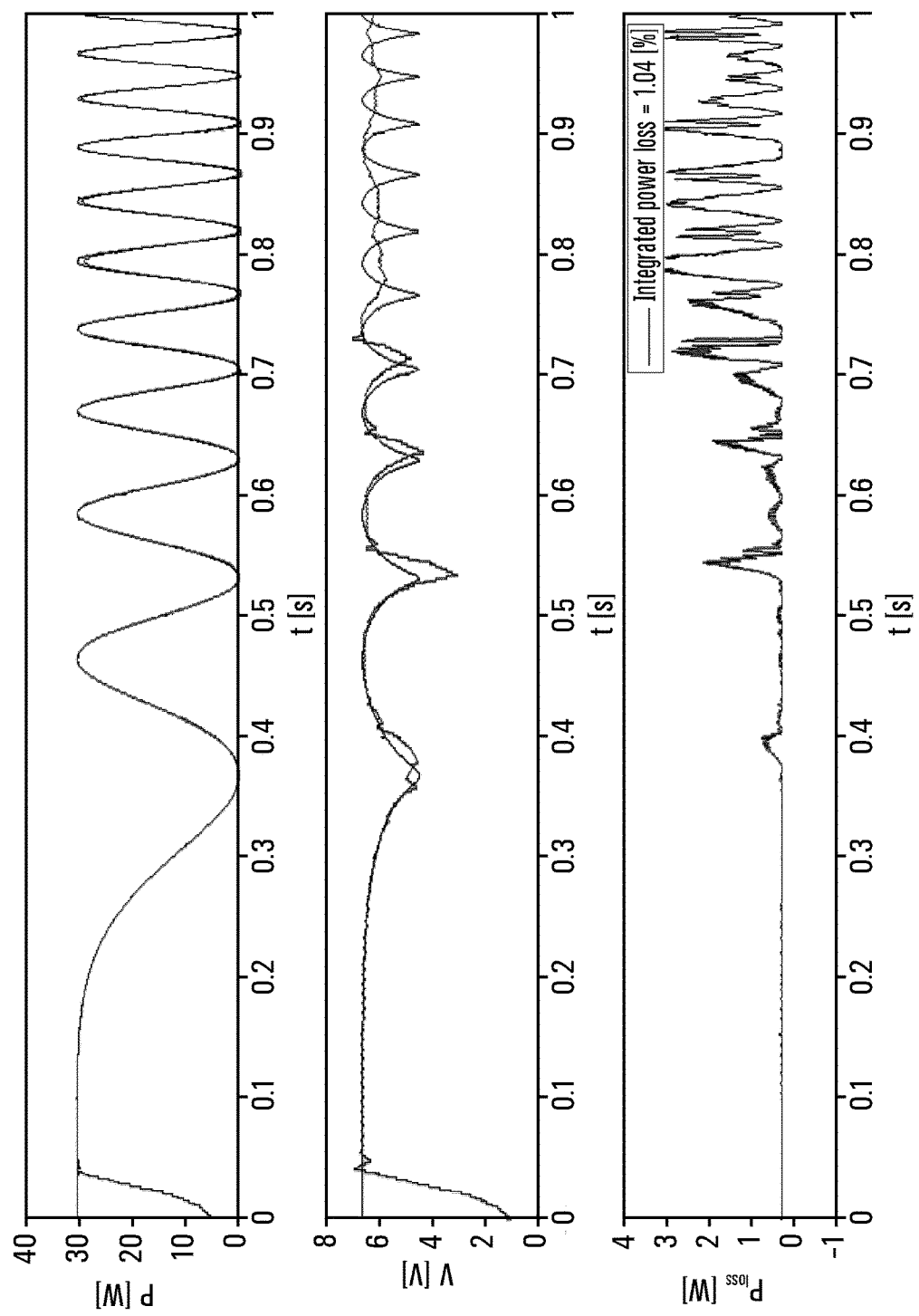
FIG. 9 includes example simulation plots of power, operating voltage, and power loss versus time, for an example perturb and observe technique with linear estimation and adaptive step size.

FIG. 9 includes example simulation plots of power, operating voltage, and power loss versus time, for an example perturb and observe technique with linear estimation and adaptive step size. Initial convergence time is improved relative to FIG. 8, and overall performance is also improved. $P_{loss}$ in this example is further reduced, to 1.04%.

Figure 10:
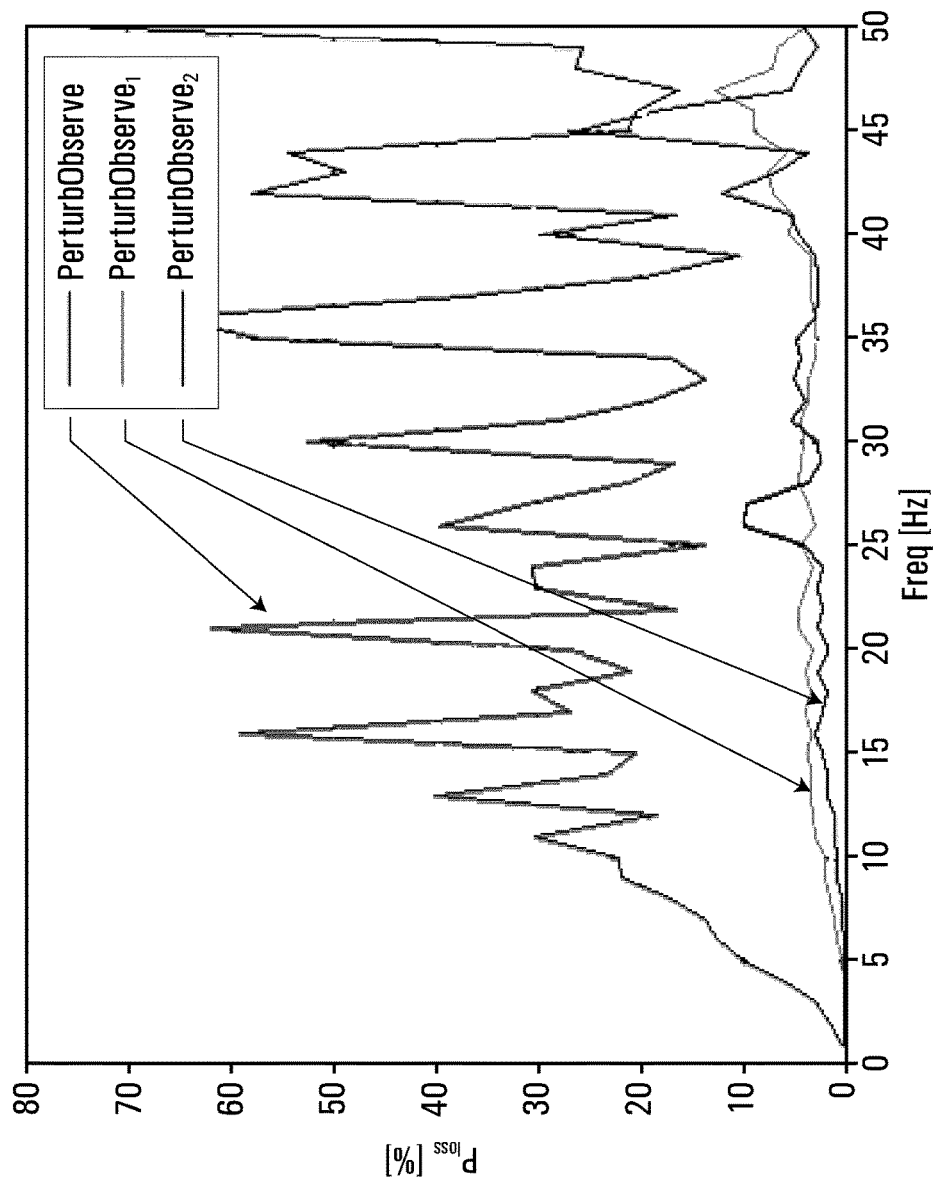
FIG. 10 includes example simulation plots of power loss versus light level frequency for three example MPP tracking techniques.
Figure 11:
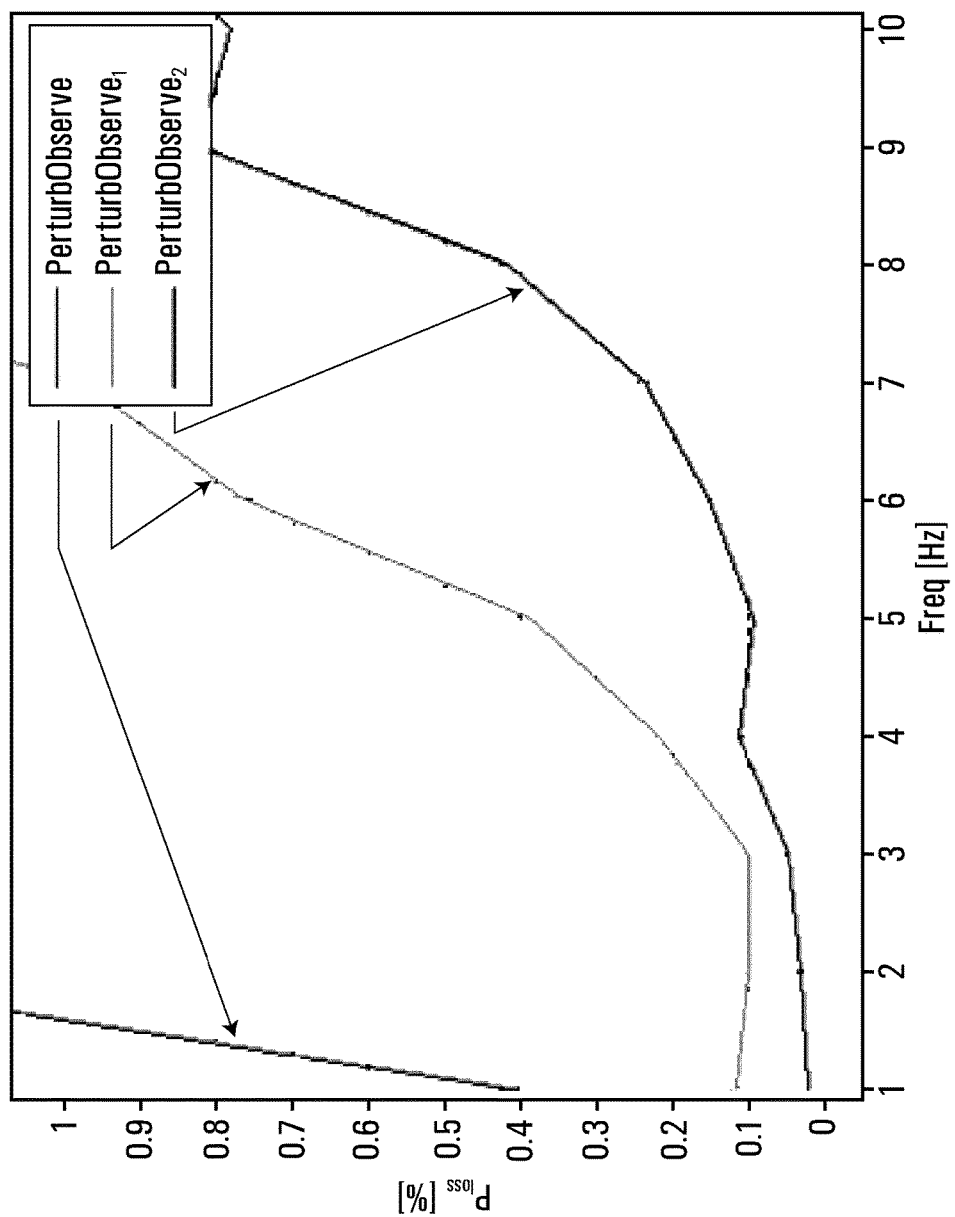
FIG. 11 includes example simulation plots of power loss versus light level frequency for the three example MPP tracking techniques of FIG. 10, on different power and frequency scales.

FIGS. 10 and 11 include example simulation plots of power loss versus light level frequency for three example MPP tracking techniques. The three techniques are the same as those for which example simulation plots are shown in FIGS. 3, 8, and 9, namely perturb and observe ("PerturbObserve"), perturb and observe with linear prediction ("PerturbObserve$_1$"), and perturb and observe with linear prediction and adaptive step size ("PerturbObserve$_2$").

FIG. 11 includes plots of power loss versus light level frequency for the three example MPP tracking techniques of FIG. 10, on different power and frequency scales.

What has been described is merely illustrative of the application of principles of embodiments of the invention. Other arrangements and methods can be implemented by those skilled in the art without departing from the scope of the present invention.

For example, methods according to other embodiments may include further, fewer, and/or different operations, performed in a similar or different order than shown in FIGS. 5A/5B and 6A/6B. The divisions of function represented in FIG. 7 are also illustrative, and accordingly apparatus implementations may include further, fewer, or different components, interconnected in a similar or different manner than explicitly shown in the drawings.

It should also be appreciated that the functions described herein could be implemented in any of various ways, in one or more processors executing software stored in computer-readable storage, Application Specific Integrated Circuits (ASICs), Programmable Logic Devices (PLDs), and/or Field Programmable Gate Arrays (FPGAs), for instance.

In addition, although described primarily in the context of methods and systems, other implementations are also contemplated, as instructions stored on a non-transitory computer-readable medium such as a magnetic or optical disk or a solid state memory device, for example.

I claim:

1. A method comprising:
   obtaining output power samples of power output from a plurality of photovoltaic (PV) cells, the output power samples comprising perturbed samples for which a perturbation is applied to an operating voltage or current of the plurality of PV cells and non-perturbed samples for which no perturbation is applied to the operating voltage or current; and
   generating a control output to change the operating voltage or current of the plurality of PV cells for a next perturbed sample by a next perturbation based on a difference between:
   (1) a change in output power between a non-perturbed sample and a perturbed sample preceding the non-perturbed sample, and
   (2) a change in output power between the non-perturbed sample and a perturbed sample following the non-perturbed sample,
      wherein the next perturbation is in a direction based on the difference,
      wherein the next perturbation is of a magnitude based on a number of changes in direction of the perturbations applied for a plurality of perturbed samples preceding the next perturbed sample.

2. The method of claim 1, the magnitude of the next perturbation comprising one of: a first magnitude where the direction of the next perturbation is different from the direction of the perturbation applied for the perturbed sample preceding the non-perturbed sample; and a second magnitude where there was no change in the direction of the perturbations applied for the perturbed samples in a predetermined number of preceding perturbed samples.

3. The method of claim 2, wherein the first magnitude is a fraction of the magnitude of the perturbation applied for the perturbed sample preceding the next perturbed sample, and the second magnitude is an integer multiple of the magnitude of the perturbation applied for the perturbed sample preceding the next perturbed sample.

4. The method of claim 1, the output power samples further comprising multiple consecutive perturbed samples, multiple consecutive non-perturbed samples, or both multiple consecutive perturbed samples and multiple consecutive non-perturbed samples.

5. The method of claim 1, wherein the change in output power between the non-perturbed sample and the perturbed sample preceding the non-perturbed sample is based on multiple consecutive non-perturbed samples including the non-perturbed sample and a plurality of further non-perturbed samples following the perturbed sample.

6. The method of claim 1, the generating comprising:
   generating the control output to increase the operating voltage or decrease the operating current responsive to the operating voltage being below a minimum operating voltage.

7. An apparatus comprising:
   a plurality of photovoltaic (PV) cells; and
   a tracking module, operatively coupled to the plurality of PV cells, to obtain output power samples of power output from the plurality of PV cells, the output power samples comprising perturbed samples for which a perturbation is applied to an operating voltage or current of the plurality of PV cells and non-perturbed samples for which no perturbation is applied to the operating voltage or current; and to generate a control output to change the operating voltage or current of the plurality of PV cells for a next perturbed sample by a next perturbation based on a difference between:
(1) a change in output power between a non-perturbed sample and a perturbed sample preceding the non-perturbed sample, and
(2) a change in output power between the non-perturbed sample and a perturbed sample following the non-perturbed sample,
the next perturbation being in a direction based on the difference,
the next perturbation being of a magnitude based on a number of changes in direction of the perturbations applied for a plurality of perturbed samples preceding the next perturbed sample.

8. The apparatus of claim 7, the magnitude of the next perturbation comprising one of: a first magnitude where the direction of the next perturbation is different from the direction of the perturbation applied for the perturbed sample preceding the non-perturbed sample; and a second magnitude where there was no change in the direction of the perturbations applied for the perturbed samples in a predetermined number of preceding perturbed samples.

9. The apparatus of claim 8, wherein the first magnitude is a fraction of the magnitude of the perturbation applied for the perturbed sample preceding the next perturbed sample, and the second magnitude is an integer multiple of the magnitude of the perturbation applied for the perturbed sample preceding the next perturbed sample.

10. The apparatus of claim 7, further comprising:
a power converter operatively coupled to the plurality of PV cells,
the tracking module controlling the operating voltage or current of the plurality of PV cells by controlling operation of the power converter.

11. The apparatus of claim 7, further comprising:
a memory, operatively coupled to the tracking module, to store records of a plurality of:
the output power samples;
changes in output power between the output power samples; and
directions of perturbations for the perturbed samples.

12. The apparatus of claim 11, further comprising:
a power converter operatively coupled to the plurality of PV cells,
a controller to control operation of the power converter, the controller comprising the tracking module.

13. The apparatus of claim 7, the tracking module changing the operating voltage or current of the plurality of PV cells by the next perturbation.

14. The apparatus of claim 7, the output power samples further comprising multiple consecutive perturbed samples, multiple consecutive non-perturbed samples, or both multiple consecutive perturbed samples and multiple consecutive non-perturbed samples.

15. The apparatus of claim 7, the tracking module generating the control output to increase the operating voltage or decrease the operating current responsive to the operating voltage being below a minimum operating voltage.

16. An apparatus comprising:
a plurality of photovoltaic (PV) cells; and
a tracking module, operatively coupled to the plurality of PV cells, to obtain output power samples from the plurality of PV cells, the output power samples comprising perturbed samples for which a perturbation is applied to an operating voltage or current of the plurality of PV cells; and
to generate a control output to change the operating voltage or the operating current of the plurality of PV cells for a next perturbed sample by a next perturbation, the next perturbation being in a direction based on a change in output power samples, and
of a magnitude based on the direction of the next perturbation and
a direction of perturbations applied for a plurality of perturbed samples preceding the next perturbed sample.

17. The apparatus of claim 16, wherein the magnitude comprises a magnitude determined by applying an adjustment to a magnitude applied for a most recent perturbed sample preceding the next perturbed sample.

18. The apparatus of claim 17, wherein the magnitude of the next perturbation is a minimum value where the magnitude determined by applying the adjustment is below the minimum value, and the magnitude of the next perturbation is a maximum value where the magnitude determined by applying the adjustment is above the maximum value.

19. The apparatus of claim 16, the tracking module changing the operating voltage or current of the plurality of PV cells by the next perturbation.

20. The apparatus of claim 16, the tracking module generating the control output to increase the operating voltage or decrease the operating current responsive to the operating voltage being below a minimum operating voltage.

* * * * *